April 9, 1935.  H. SVENSSON  1,996,938
MOTION CHANGING DEVICE
Filed Oct. 25, 1933
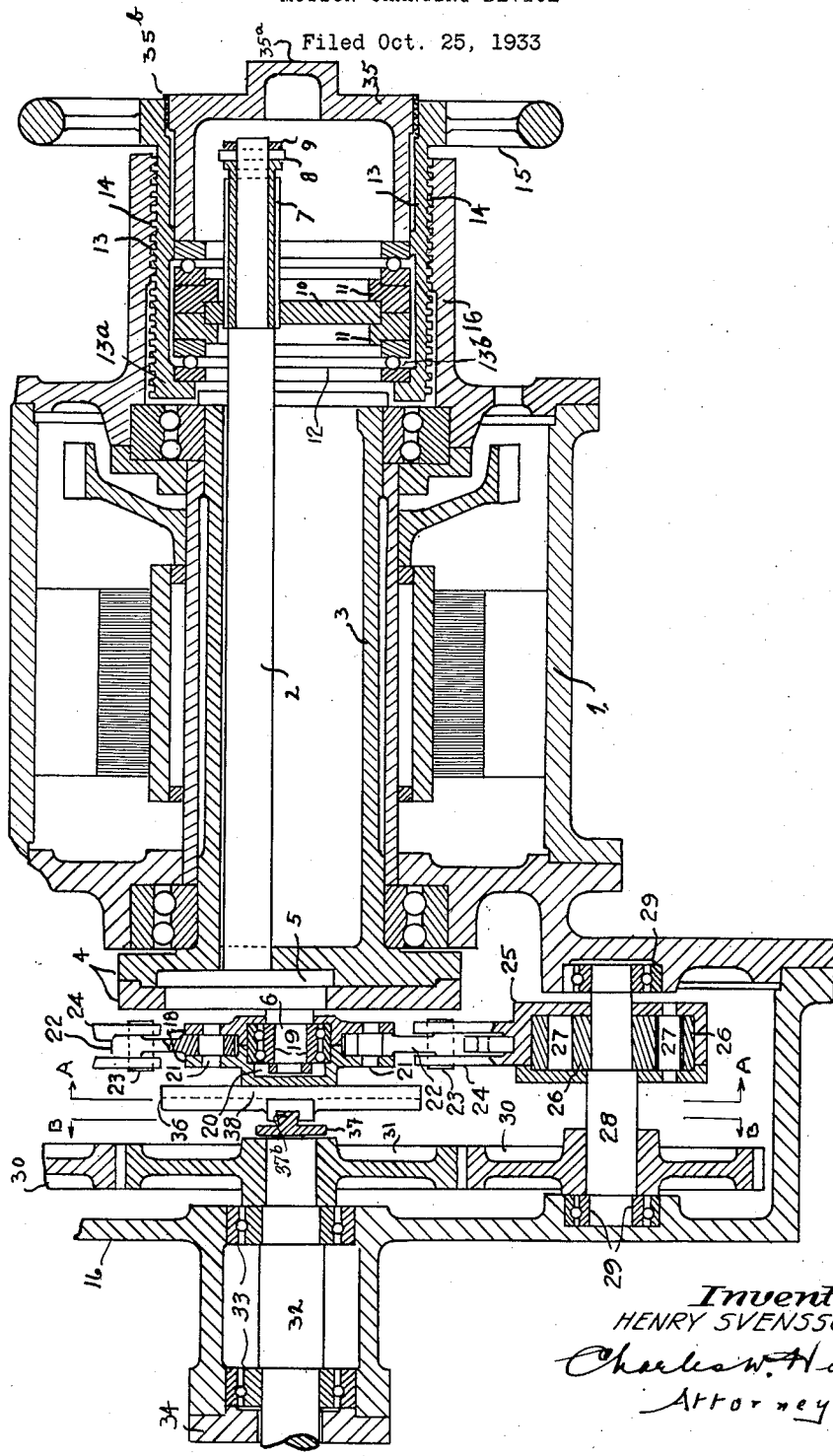
Inventor:
HENRY SVENSSON
Charles W. Hills
Attorney Patented Apr. 9, 1935

1,996,938

UNITED STATES PATENT OFFICE 1,996,938

MOTION CHANGING DEVICE

Henry Svensson, Gottenborg, Sweden, assignor to Monad Corporation, Chicago, Ill., a corporation of Illinois Application October 25, 1933, Serial No. 695,293
In Sweden March 2, 1933

4 Claims. (Cl. 74—600)

This invention relates to a motion changing device and concerns itself primarily with means for varying the speed of a driven member from zero to a certain maximum in a novel and efficient manner, during the operation of the device.

The invention comprises the novel structure and combination of parts hereinafter described and more particularly pointed out and defined in the appended claims.

In the drawing which illustrates one form of the invention, the figure is a longitudinal sectional view through a motion changing device involving this invention.

In the drawing, there is shown a casing 1 which encloses the main parts of the operating mechanism. This casing embodies a bearing for a hollow driving shaft 3 which may be a motor shaft. Within the hollow shaft 3 and eccentric with respect to the axis thereof there is a rod or shaft 2 having a stepped disk 5 upon its forward end. It will be noted that the forward end of the motor shaft 3 has a flange consisting of the parts 4—4 in which the stepped disk 5 is located. A crank pin 6 extends eccentrically from the disk 5 and has a ring 18 journalled thereon by means of ball bearings 19.

To the disk 18 there are pivotally connected by pins 21 a plurality of links 22, and these links are pivotally connected by means of pivots 23 to oscillating arms 24 attached to casings 25 journalled upon shafts 28 only one of which is shown. Between suitable bushings 26, one of which surrounds each shaft and the other which forms the interior wall of each casing, are clutch rollers 27 forming the well known roller clutches that operate in one direction.

The shafts 28 are journalled by means of ball bearings 29 in the casing 1 and an auxiliary casing 16 in spaced relation to the front wall of the casing 1. Each shaft 28 has a gear 30 secured thereon that meshes with a gear 31 secured upon a driven shaft 32 journalled in ball bearings 33 in the auxiliary casing 16. It will be evident that the successive actuations of the arms 24 will successively cause the actuation of the roller clutches for successively imparting impulses to the driving shaft 32.

A guide member 37 is attached to the main casing 1 by means of bolts or the like. This guide member has a dove-tail upon its rear face. A cross head 36 provided with a dove-tail groove for receiving the dove-tail 37$^b$ is slidably mounted thereon. The rear or right hand face of the cross head 36 as viewed in Figure 1 is provided with groove 38. The aforementioned ring 18 is provided with a rib fitting in such groove. The ring 18 is hence connected to the auxiliary casing by means of a gimbal joint.

In the operation of the parts thus far described, it will be evident that when the crank 6 is rotated in its orbital path, it will carry the ring 18 therewith for imparting successive impulses to shafts 28 and 32, the crank being freely rotatable in the disk 18 which can slide along the cross head 36, while the said cross head 36 can slide along the guide member 37 at right angles to the cross head 36.

With this construction and operation it is possible to vary the speed of the driven shaft 32 from zero to a predetermined maximum. The shaft or rod 2 is susceptible of being rotated as will later more fully appear to vary the throw of the crank pin 6 with respect to the center of the motor shaft 3. This variation in throw of the crank pin 6 will vary the circle of movement of the ring 18 and hence vary the impulses of gears 30.

In the position of the parts as shown in the drawing, the crank pin 6 has a radius with respect to the center of the shaft 3. Now when the rod 2 is rotated to bring the crank pin 6 coincident with the center of the motor shaft 3 so that the radius thereof is zero, there will of course be no impulses. Now if the rod 2 is rotated to remove the crank pin 2 from the center of the motor shaft, it will have a radius with respect to such center and will be capable of moving ring 18 in a small orbit. As the position of the crank pin is varied to increase such radius, the orbital path of movement of the ring 18 will increase with the result that the impulses imparted by gears 30 will increase. Consequently as the throw or radius of the crank pin 6 with respect to the motor shaft is increased, the speed of the driving shaft is increased.

The means for adjusting or rotating the rod 2 to vary the throw of the crank pin 6 will now be set forth. Upon the right hand end of rod 2, there is secured an externally threaded sleeve 7. The sleeve 7 is shown as provided with a head 9 and a pin 8 passing thru the head and rod 2 for rigidly securing the sleeve to the rod. A hand wheel 15 which is provided with an externally threaded sleeve 13 is threaded in the right hand end of the casing 1 which is internally threaded as indicated at 14 for such a purpose. The inner end of the sleeve 13 has an annular inwardly directed shoulder 13$^a$. Within the sleeve 13 are spaced roller thrust bearings 13$^b$ formed by rings 12, one thrust bearing abutting shoulder 13$^a$. Between these bearings are adjacent rings 11 having their adjacent edges rabbeted to form a groove in which a ring 10 is positioned. The ring 10 is provided with a threaded aperture thru which the threaded sleeve 7 passes. A cap 35 is threaded in the right hand end of the sleeve 13 as indicated at 35b. This cap abuts the right hand thrust bearing and it is provided with a polygonal boss 35a for receiving a wrench, whereby the same may be adjusted for tightening the thrust bearings 13b. A cap 34 may be used to close the bearing sleeve on the auxiliary casing 16.

When the hand wheel 15 is rotated, it will rotate relative to the rings 10 and 11, but it will carry the same therewith in whatever longitudinal direction it is caused to move. This bodily longitudinal movement that is thuswise imparted to ring 10 will cause it to rotate rod 2 thru its threaded relation with sleeve 7 which it will be noted has highly sloping threads for such a purpose. This rotation of rod 2 will vary the throw of the crank pin 6 with respect to the center of the motor shaft 3. The hand wheel may be rotated at any time, even when the machine is in operation for varying the throw of the crank pin 6 and this is highly desirable in some instances.

From the foregoing, it will be apparent that a novel form of speed changing mechanism has been produced which can be quickly and readily adjusted to vary the speed from zero to a predetermined maximum.

I claim as my invention:

1. In a speed changing apparatus, a driving shaft, a rod journalled eccentrically in said driving shaft, a crank pin supported upon said rod, said rod extending through said shaft, a threaded sleeve upon the extending end portion of said rod, a casing surrounding said shaft, a hand wheel having a hub threaded in said casing, a member having a threaded relation with said sleeve, means for mounting said member in said hub for relative rotation thereof and longitudinal movement therewith for causing said member to turn said sleeve and rod for varying the eccentricity of said crank pin.

2. In a speed changing device, a driving shaft, a rod eccentrically mounted in said driving shaft, and extending therethrough, a disk upon one end of said shaft and having a crank pin thereon, a sleeve having a spiral thread secured to the other end of said rod, a casing surrounding said shaft and rod, a handwheel having a hollow hub with a thread upon its outer surface in threaded relation with the interior of said casing, a ring member threaded upon said sleeve and means for journaling said ring member in said hub for longitudinal movement therewith and rotary movement thereof.

3. In a speed changing device, a casing, a hollow shaft journaled in said casing, a rod eccentrically journaled in said shaft and extending therethrough, a disk having a crank pin upon the forward end of said shaft, an externally threaded sleeve upon the rear portion of said shaft, a hand wheel having a hollow hub extending into the rear end of said casing and in threaded relation therewith, a ring member in threaded relation with said sleeve, a bearing upon each side of said ring, said hub having an inwardly directed flange for engaging the inner bearing and an adjustable sleeve in said hub for engaging the other bearing.

4. In a speed changing device, a casing, a hollow shaft journaled in said casing, a rod eccentrically journaled in said shaft, means upon the forward end of said rod carrying a crank pin, an externally threaded sleeve upon the rear end portion of said rod, a ring member in threaded relation with said sleeve, a hand wheel having a hollow hub threaded in said casing and surrounding said sleeve and ring member, and means for journaling said ring member in said hollow member for relative rotation thereto and longitudinal movement therewith.

HENRY SVENSSON.